United States Patent [19]
Grgurich et al.

[11] 3,768,248
[45] Oct. 30, 1973

[54] EXHAUST MANIFOLDING

[75] Inventors: William A. Grgurich, East Peoria; Morris A. Swanson, Washington, both of Ill.

[73] Assignee: Caterpillar Tractor Co., Peoria, Ill.

[22] Filed: Dec. 27, 1971

[21] Appl. No.: 212,147

[52] U.S. Cl. ................................................ 60/13
[51] Int. Cl. ............................................ F02b 37/04
[58] Field of Search ............................. 60/13, 280

[56] References Cited
UNITED STATES PATENTS
| | | | |
|---|---|---|---|
| 2,730,861 | 1/1956 | Buchi | 60/13 |
| 3,298,332 | 1/1957 | Elsbett | 60/13 |
| 3,292,364 | 12/1966 | Cazier | 60/13 |
| 2,838,907 | 6/1958 | Cowlerd | 60/13 |
| 3,618,313 | 11/1971 | Zehnder | 60/13 |

FOREIGN PATENTS OR APPLICATIONS
| | | | |
|---|---|---|---|
| 1,355,877 | 2/1964 | France | 60/13 |

*Primary Examiner*—Carlton R. Croyle
*Assistant Examiner*—Warren Olsen
*Attorney*—Freling E. Baker

[57] ABSTRACT

There is disclosed a unique manifold arrangement for turbocharged internal combustion engines having a multiple of four cylinders. The manifold system is arranged to provide even spacing between alternate sets of non-interfering cylinders to provide an even flow of exhaust to the branches of the manifold.

16 Claims, 5 Drawing Figures

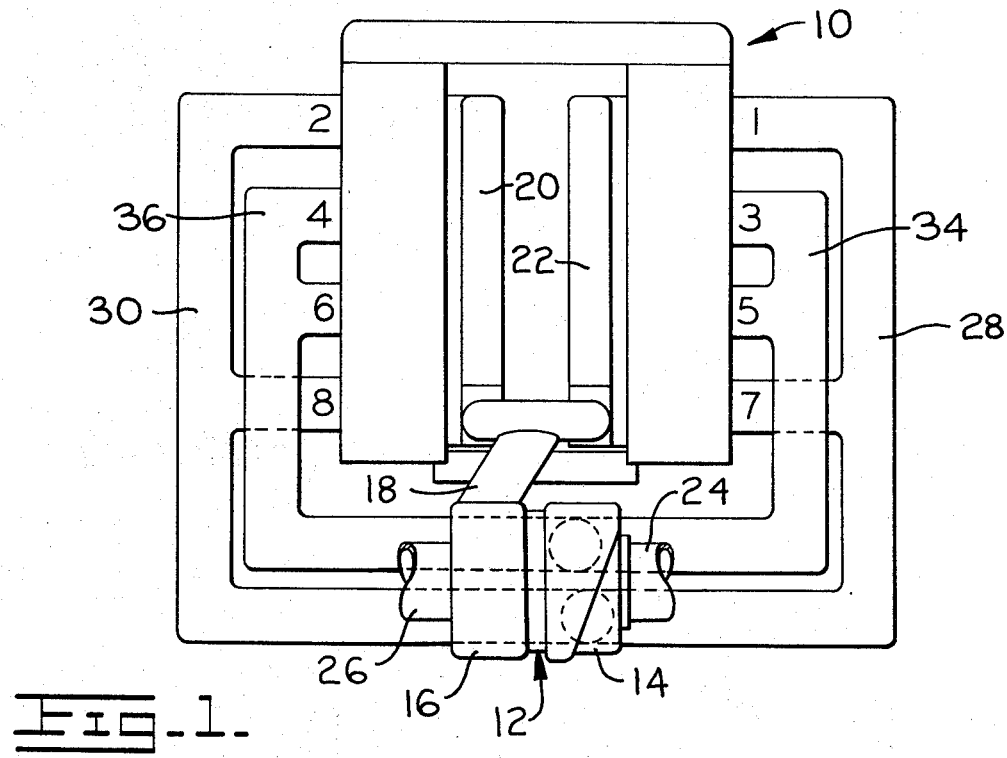
Fig_1.
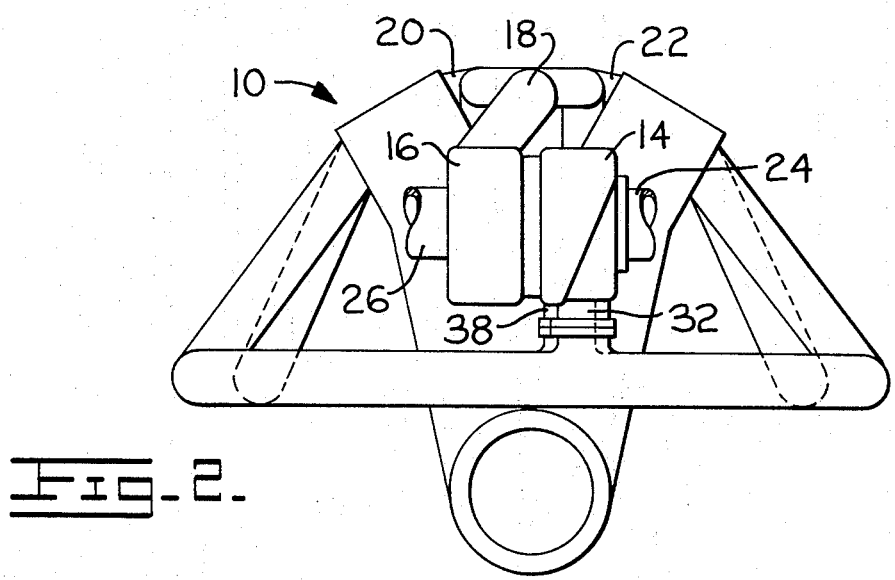
Fig_2.
INVENTORS
WILLIAM A. GRGURICH
MORRIS A. SWANSON

INVENTORS
WILLIAM A. GRGURICH
MORRIS A. SWANSON

EXHAUST MANIFOLDING

BACKGROUND OF THE INVENTION

The present invention relates to internal combustion engines and pertains more particularly to an improved exhaust manifolding system for a turbocharged internal combustion engine.

The use of engine exhaust gases to drive a turbine which in turn compresses gases for the intake of an internal combustion engine has been known for some time. The basic problem with such systems, however, is that the flow from the internal combustion engine is an unsteady or intermittent flow device whereas the turbine is basically a steady flow device. Numerous factors must be taken into consideration when connecting the exhaust ports of such an engine with the intake of a turbine. First of all, it is necesary to maintain as steady a flow of gases as possible into the turbine. This fact is complicated by the fact that improper connection of a pair of cylinders or plurality of cylinders into a manifold often times results in the exhaust gases from one cylinder interfering with the exhaust from another thus inhibiting the scavenging of the engine. This results in poor performance of the engine. Very complex arrangments of manifolding are normally provided for such systems in order to make them operable.

When an exhaust manifolding system is properly connected and properly arranged the manifolding may promote good scavenging and increase the low speed turbocharger output and improve engine performance. Engines having a multiple of three cylinders are well suited to turbocharging because of the exhaust cycle and the firing cycle of the engine. The exhaust cycle of such an engine requires approximately 240 crank degress which is available with three cylinders firing per cycle. Thus good performance has been achieved from 6 and 12 cylinder engines as a result of the good scavenging received by the divided manifold. The turbine operated by such a system will operate at full admission because one cylinder is always exhausting into the manifold An engine having four cylinders firing at equally spaced intervals connected to a common manifold will have very poor scavenging. This is because the exhaust cycle is still 240° in duration but only 180° is available before another cylinder fires. This results in an interference between the cylinders and consequent poor scavenging of the cylinders. The consequences of poor scavenging are poor low speed performance and inefficient combustion.

Numerous manifolding systems have been proposed for these engines, however, these systems suffer from numerous disadvantages. For example, an open system with one turbocharger has the advantages of low cost and simplicity and good performance at rated engine speed but has the disadvantage of poor low speed performance and a narrow operating range. A completely divided system using two turbochargers has improved low speed performance but has the disadvantage of cost and installation complications. A completely divided system with one turbocharger has the disadvantages of exciting forces caused by sharp pressure gradients, less than optimum turbine efficiency, turbine housing complications and poor high speed engine performance because of unnecessarily high back pressure to the turbine. A divided system connecting only two cylinders per branch greatly improves performance but has a low turbine efficiency with a further disadvantage of substantial structural complexity. An example of this complexity is the V-16 which if divided according to known practices would require either two four-way divided turbines or four two-way divided turbines and four manifold pipes per bank. This arrangement may require more space than is available on an existing engine.

SUMMARY OF THE INVENTION

It is therefore the primary object of the present invention to provide an exhaust manifolding system for a turbocharged engine having a multiple of four cylinders, that is simple in arrangement and efficient in operation.

Another object of the present invention is to provide a manifolding system for a turbocharged engine which has the performance advantages of the divided system with minimum structural complexity.

A further object of the present invention is to provide a simple and efficient manifolding system that overcomes the disadvantages of the prior art systems.

In accordance with the present invention a manifold is provided which groups the cylinders in sets which fire substantially simultaneously to prevent interference between the cylinders.

BRIEF DESCRIPTION OF THE DRAWINGS

The above and other objects and advantages of the present invention will become apparent from the following description when read in conjunction with the accompanying drawings wherein:

FIG. 1 is a top view of an internal combustion engine incorporating the present invention;

FIG. 2 is an end view of the modification of FIG. 1;

DETAILED DESCRIPTION OF PREFERRED EMBODIMENT

Figure 3:
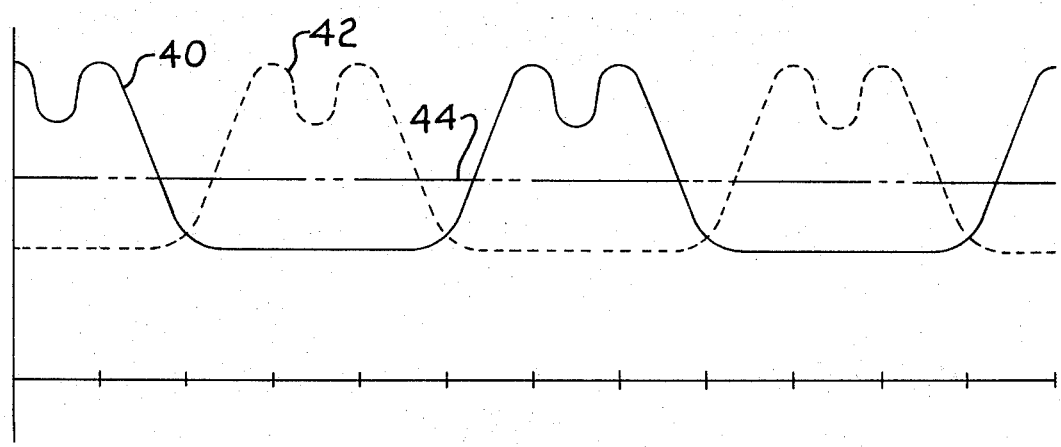
FIG. 3 is a plot of exhaust pressure as against crank angle.

Referring now to the drawings and in particular to FIG. 1, there is illustrated a top view of a typical V-8 engine having a manifolding system constructed in accordance with the present invention. The illustrated engine is a typical V-8 engine with the cylinders numbered 1-8 as indicated on the drawings with the even numbers on one side of the engine and the odd numbers on the other side. Typically, the numbering begins at front of the engine such as with FIG. 1; the front of the engine being the top. The engine designated by the numeral 10 is provided with a turbocharger 12 having a single turbine 14 and a compressor 16 for supplying air by way of conduit 18 to the intake manifold 20 and 22 of the engine. The firing order for the illustrated engine is 1, 8, 5, 4, 7, 2, 3, 6. The firing order and spacing of firing is determined by the crankshaft configuration and the bank angle. Once the crankshaft configuration and bank angle are selected the firing intervals are fixed. Of course, the bank angle of a straight 8 cylinder engine would be zero. The turbine 14 is powered by gases from the exhaust manifold which flow therethrough and are carried off by suitable exhaust pipe system 24. The turbine 14 powers the compressor 16 which draws air from an intake 26 and forces it into the intake manifold 20 and 22 for scavenging and charging the combustion chambers between firing cycles.

The exhaust manifold arrangement of the present invention comprises a first manifold having a branch 28 serving cylinders 1 and 7 and a second branch 30 serving cylinders 2 and 8 and conveying the gases to one inlet 32 of turbine 14. A second manifold having a first branch 34 serving cylinders 3 and 5 and a second branch 36 serving cylinders 4 and 6 and conveying the gases to inlet 38 of turbine 14. Thus the arrangement of the present exhaust manifolding system groups the cylinders in sets which fire substantially simultaneously since they cannot interfere with one another. Since no two cylinders fire simultaneously, the two cylinders which fire close in order are grouped together. Thus, the first two cylinders to fire, 1 and 8, are grouped together in the first manifold so that the exhaust from these cylinders appears as one exhaust pulse at the turbine inlet 32. The cylinders immediately following, that is, cylinders 5 and 4, are served by the second exhaust manifold with the exhaust therefrom appearing as a single pulse at the second turbine inlet 38. Exhaust pulses are thus delivered to the turbine without interfering with one another resulting in increased low speed performance and improved combustion.

Figure 3A:
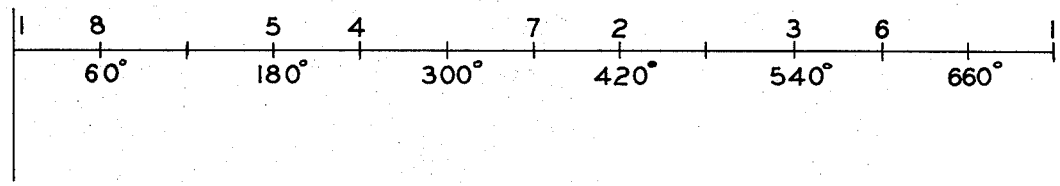
FIG. 3a is a scale showing the firing order and interval therebetween.
Figure 3B:
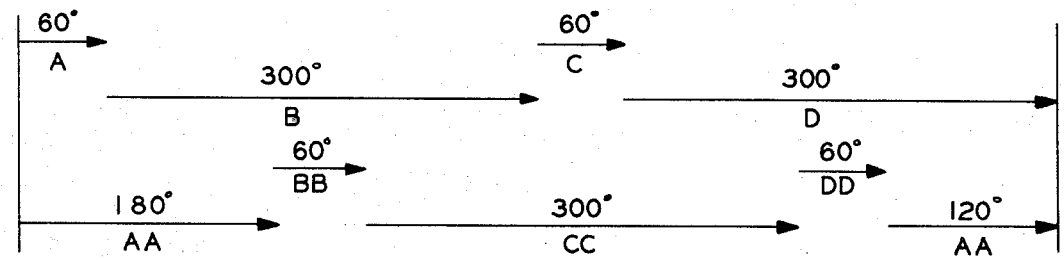
FIG. 3b is a graphic illustration of the duration between the firing of the cylinders served by a given manifold.

These exhaust pulse spacings are graphically illustrated in FIG. 3 through 3b. The solid line 40 illustrated in FIG. 3 indicates the pressure of the exhaust of each of the cylinders in time as it feeds into the first exhaust manifold. That is, it shows at zero crank angle the exhaust pressure of cylinder 1 feeding into the first exhaust manifold while at 60° of the crank later, cylinder 8 fires. and the exhaust thereof leads into the same manifold. The dotted line 42 illustrates the pressure from the cylinders which feed into the second manifold and their relationship at the given crank angle's degrees with the firing sequence and crank angle's degrees shown on the scale of FIG. 3a which is lined up with FIG. 3. Broken line 44 illustrates the inlet manifold pressure whereby the scavenging differential is shown by the height of this line above lines 40 and 42.

FIG. 3b illustrates the duration between cylinder firings or the cylinders served by each of the manifolds. Arrows a, b, c, and d illustrate the duration between the cylinder firing of cylinders 1-8, 7-2, which are served by the first exhaust manifold. The arrows aa, bb, cc, and dd, illustrate the duration between cylinders 5-4, and 3-6 served by the second exhaust manifold. Thus, the cylinders are grouped in sets which fire 60° apart with the cylinders in each set alternating between the branches of the particular manifold. Interspersed between the sets of cylinders in a manifold, is a set of cylinders from the other manifold.

In a V16 engine the exhaust manifold arrangement comprises a first group of eight cylinders having a first and second manifold with the branches conveying exhaust gases to the first and second turbine inlets of a first turbocharger in a manner similar to the V8 engine described above. A second group of eight cylinders has a third and fourth manifold, comparable to the first and second manifold, with the branches conveying exhaust gases to the first and second turbine inlets of a second turbocharger also in a manner similar to the above V8. For example in a V16 engine having a firing order of 1, 2, 11, 12, 3, 4, 7, 8, 15, 16, 5, 6, 13, 14, 9, 10, the branches for cylinders 1-7 and 2-8 convey gases to the first turbine inlet of the first turbocharger and the branches for cylinder 9-15 and 10-16 convey gases to the first turbine inlet of the second turbocharger. The branches for cylinders 3-5 and 4-6 convey gases to the second turbine inlet of the first turbocharger and the branches for cylinders 11-13 and 12-14 convey gases to the second turbine inlet of the second turbocharger. The cylinders are thus grouped together in sets so that the exhaust pulses of any two cylinders firing close in order appear as a single pulse at a turbine inlet.

In an alternate exhaust manifold arrangement for a V16 engine each bank of cylinders has two manifolds, each manifold conveying exhaust gases from four cylinders in each bank to a first or second turbine inlet of a turbocharger. This arrangement would be utilized to convey exhaust pulses, from cylinders that fire close in order in the same bank, to a turbocharger having a first and second turbine inlet communicating with two manifolds in the same cylinder bank. For an example in a V16 engine having a firing order of 1, 2, 11, 12, 3, 4, 9, 10, 15, 16, 5, 6, 13, 14, 7, 8 the odd numbered cylinder bank would fire in the order 7-1, 5-3, 9-15, 11-13. Therefore, cylinders 7-1 which fire close in order have their pulses conveyed to a first manifold while cylinder 5-3 have their pulses conveyed to a second manifold. The pulses of cylinders 9-15 are conveyed to the first manifold and the pulses of cylinders 11-13 are conveyed to the second manifold. The pulses in the first manifold are received at a first turbine inlet of a first turbocharger and the pulses in the second manifold are received at a second turbine inlet of the same turbocharger. An identical arrangement is used on the even numbered bank and a second turbocharger is utilized. The cylinders are grouped together in sets, firing in close order, so that the exhaust pulses of the cylinder sets appear as a single pulse at a turbine inlet.

Thus, it is seen that the present invention provides a simplified manifold structure for an internal combustion engine have a multiple of four cylinders and having a single turbine for driving the intake compressor. The system provides improved scavenging with valve overlap, separation of exhaust pulses, and improved combustion with resulting higher efficiency of the engine.

While the present invention has been described with respect to a particular embodiment, it is to be understood that changes may be made in the structure and arrangement of parts without departing from the spirit and scope of the present invention as defined in the appended claims.

It is claimed that:

1. An exhaust manifolding system for an internal combustion engine having at least an interger multiple of four cylinders and an intake manifold, said system comprising:

at least one turbocharger comprising a turbine and a compressor for compressing the air to the intake manifold of said engine;

at least a pair of exhaust manifolds for said engine, said exhaust manifolds operatively connected for directing exhaust gases from the cylinders of said engine to the turbine of said turbocharger;

said manifolds connected to alternate pairs of said cylinders in order of firing so that the first and second cylinders in order of firing are grouped together to define a set connected to one of said manifolds; and the next two cylinders in order of firing are connected to the other of said manifolds so that the alternate pairs to any one manifold are separated by a single pair of cylinders connected to the other of said manifolds.

2. The invention of claim 1 comprising at least a single turbine turbocharger having double inlets.

3. The invention of claim 1 wherein said engine has a minimum of eight cylinders.

4. The invention of claim 1 wherein said engine has an even multiple of four cylinders.

5. The invention of claim 4 wherein said engine is of a vee configuration.

6. The invention of claim 5 wherein the first and second cylinders in order of firing within a bank of said engine are connected to one of said manifolds and, the next two cylinders in order of firing within the bank are connected to another of said manifolds.

7. The invention of claim 5 wherein the cylinder banks have a 60° angle between them.

8. The invention of claim 4 wherein each manifold serves at least two sets of cylinders; and, the cylinders within a set fire 60° apart.

9. The invention in claim 5 wherein each manifold serves at least two sets of cylinders; and each set comprises an odd numbered cylinder and an even numbered cylinder, the even numbered being those in one bank of the engine and the odd numbered being in the other bank.

10. The invention of claim 9 wherein said cylinders within a set fire together.

11. The invention of claim 9 wherein the firing of the cylinders within a set are separated by an angle equal to the angle between the banks of cylinders.

12. The invention of claim 4 wherein each manifold serves at least two sets of cylinders; and, each set comprises two cylinders.

13. The invention of claim 12 wherein the cylinders within each set fire at an angle of 60° apart; and, the sets served by a manifold are separated by an angle of 300°.

14. The invention of claim 5 wherein each of said manifolds is a divided manifold.

15. The invention Of claim 14 wherein said manifold serves at least a set of cylinders; and, each set comprises a cylinder from each bank.

16. The invention of claim 15 wherein the cylinders in each set fire substantially together.

* * * * *